US011341811B2

(12) United States Patent
Higgins et al.

(10) Patent No.: US 11,341,811 B2
(45) Date of Patent: May 24, 2022

(54) SYSTEM ENROLLMENT VIA AN ELECTRONIC GAMING MACHINE

(71) Applicant: IGT, Las Vegas, NV (US)

(72) Inventors: Kevin Higgins, Reno, NV (US); Dwayne Nelson, Las Vegas, NV (US)

(73) Assignee: IGT, Las Vegas, NV (US)

( * ) Notice: Subject to any disclaimer, the term of this patent is extended or adjusted under 35 U.S.C. 154(b) by 60 days.

(21) Appl. No.: 16/723,021

(22) Filed: Dec. 20, 2019

(65) Prior Publication Data

US 2021/0192894 A1 Jun. 24, 2021

(51) Int. Cl.
*A63F 9/24* (2006.01)
*A63F 11/00* (2006.01)
*G06F 13/00* (2006.01)
*G06F 17/00* (2019.01)
*G07F 17/32* (2006.01)

(52) U.S. Cl.
CPC ........ *G07F 17/3239* (2013.01); *G07F 17/323* (2013.01); *G07F 17/3206* (2013.01); *G07F 17/3288* (2013.01)

(58) Field of Classification Search
USPC ........................ 463/1, 20, 22, 29, 30, 40, 42
See application file for complete search history.

(56) References Cited

U.S. PATENT DOCUMENTS 8,147,334 B2 4/2012 Gatto et al.
8,764,566 B2 * 7/2014 Miltenberger ...... G07F 17/3255 463/42

OTHER PUBLICATIONS

"William Hill Sports Betting Kiosks," William Hill US Holdco Inc., 2019, 4 pages [retrieved online from: www.williamhill.us/kiosk/].

* cited by examiner

*Primary Examiner* — Adetokunbo O Torimiro
(74) *Attorney, Agent, or Firm* — Sheridan Ross P.C.

(57) ABSTRACT

The present disclosure relates generally to gaming machines, systems, and methods. As an example, a method is disclosed that includes receiving first player information from a player, logging the player into a first game management system with the first player information, providing the player with a query for information, where the query includes a request for information to create a second player account for the player in a second game management system. The method may further include receiving enrollment information, where the enrollment information includes at least some of the first player information stored in connection with a first player account maintained by the first game management system and transmitting the enrollment information to the second game management system, where the enrollment information enables the second game management system to create the second player account for the player.

20 Claims, 6 Drawing Sheets

SYSTEM ENROLLMENT VIA AN ELECTRONIC GAMING MACHINE

BACKGROUND

The present disclosure is generally directed to gaming machines and gaming system and, in particular, toward user enrollment processes facilitated by gaming machines.

Electronic gaming machines (EGMs) traditionally facilitated gameplay with a single game, such as video poker, a slot game, keno, or the like. As EGMs and networking technology in general have evolved, the management of games and gameplay on EGMs has also developed. For instance, game management systems have been developed to track player activity at one or multiple different EGMs in a casino. Such game management systems also enable player tracking across multiple casinos or, in some instances, facilitate loyalty opportunities for a player that frequents a casino often or plays a particular type of game at an EGM on more than one occasion. Loyalty opportunities are normally reserved for players that enroll with the game management system by creating an account therewith.

Other developments in the casino environment include the expansion of sports wager products onto the casino floor. For instance, some EGMs are now being equipped with functionality that enables a player to place or track sports wagers at an EGM while also playing the native game offered by the EGM (e.g., video poker, slot game, keno, etc.). To provide this functionality, the EGM needs to be in communication with a sports wagering system in addition to being in communication with the game management system used by the casino to track player activity with respect to the native game offered by the EGM.

BRIEF SUMMARY

In certain embodiments, the present disclosure relates to an electronic gaming machine, a system, and a method. In some embodiments, an electronic gaming machine is provided, comprising: a first communication interface that enables communications with a first game management system, where the first game management system stores first player information in connection with a first player account for a player; a second communication interface that enables communications with a second game management system, where the second game management system is different from the first game management system; a processor coupled to the first communication interface and the second communication interface; and a computer-readable storage medium, coupled with the processor and comprising instructions stored thereon that are executable by the processor, where the instructions, when executed by the processor enable the processor to: launch an enrollment process for the player with respect to the second game management system; provide the player with a query for information in connection with the enrollment process, where the query comprises a request for information to create a second player account for the player in the second game management system; receive enrollment information, where the enrollment information comprises at least some of the first player information; and transmit, via the second communication interface, the enrollment information to the second game management system, where the enrollment information enables the second game management system to create the second player account for the player.

In some embodiments, a system is provided, comprising: a first game management system that tracks player activity using first player information, where the first game management system stores the first player information in connection with a first player account for a player; a second game management system that tracks player activity using second player information; and an electronic gaming machine that communicates with the first game management system and the second game management system, where the electronic gaming machine comprises: a first communication interface that enables communications with the first game management system; a second communication interface that enables communications with the second game management system; a processor coupled to the first communication interface and the second communication interface; and a computer-readable storage medium, coupled with the processor and comprising instructions stored thereon that are executable by the processor, where the instructions, when executed by the processor enable the processor to enroll the player with the second game management system by: providing the player with a query for information, where the query comprises a request for information to create a second player account for the player in the second game management system; receiving enrollment information, where the enrollment information comprises at least some of the first player information stored in connection with the first player account; and transmitting the enrollment information to the second game management system, where the enrollment information enables the second game management system to create the second player account for the player.

In some embodiments, a method of operating an electronic gaming machine is provided, comprising: receiving first player information from a player; logging the player into a first game management system with the first player information; providing the player with a query for information, where the query comprises a request for information to create a second player account for the player in a second game management system; receiving enrollment information, where the enrollment information comprises at least some of the first player information stored in connection with a first player account maintained by the first game management system; and transmitting the enrollment information to the second game management system, where the enrollment information enables the second game management system to create the second player account for the player.

Additional features and advantages are described herein and will be apparent from the following Description and the figures.

DETAILED DESCRIPTION

Figure 1:
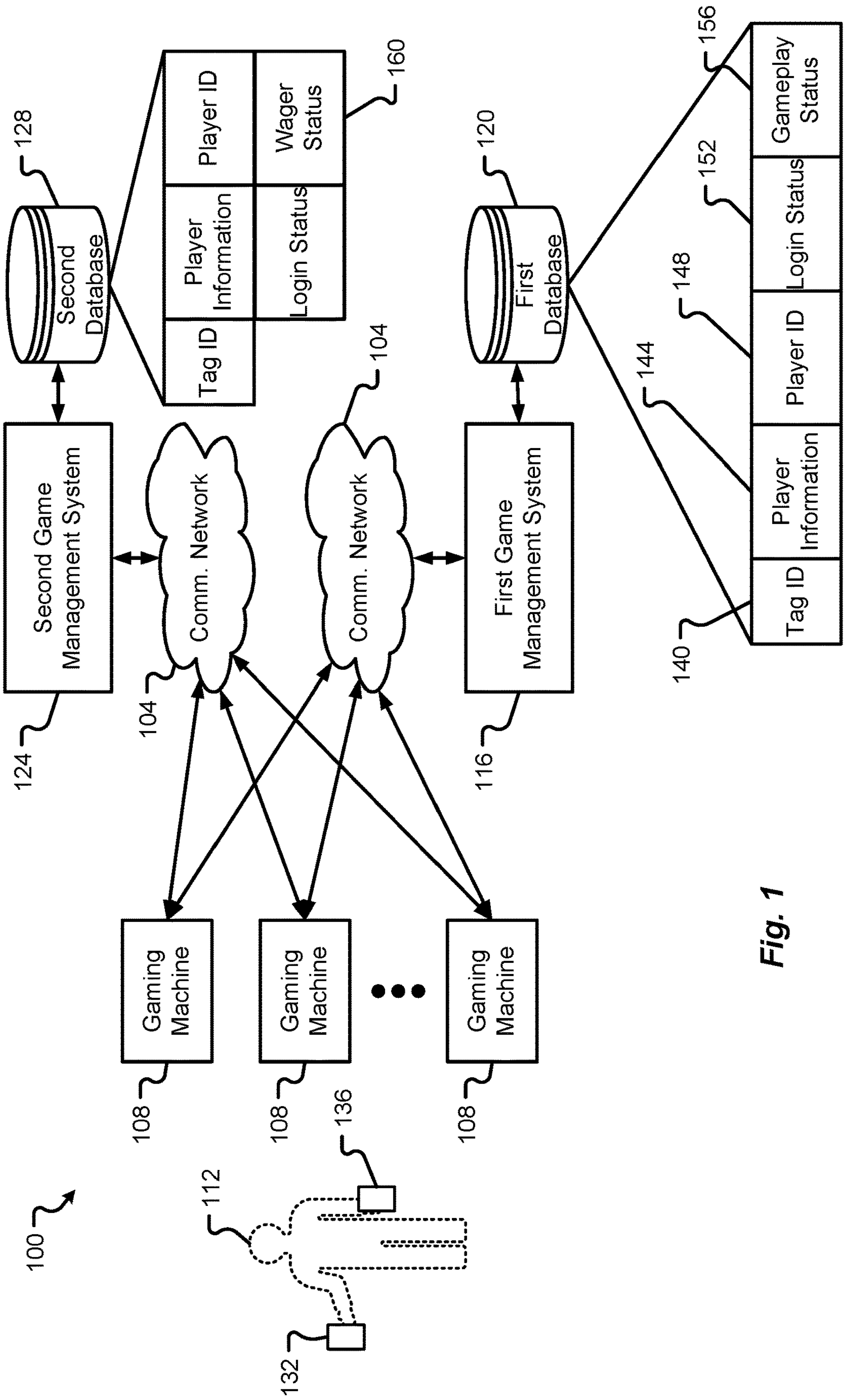
FIG. 1 is a block diagram of a system accordance with embodiments of the present disclosure.

Embodiments of the present disclosure will be described in connection with an EGM that is configured to interact with a first game management system and a second game management system. The examples of the game management systems depicted and described herein should not be construed as limiting. For instance, one example of the first game management system may correspond to a casino game management system that is used to track player activity with respect to a particular game natively offered at the EGM (e.g., video poker, slots, keno, etc.). The casino game management system, in some embodiments, may correspond to a traditional slot Player Tracking System (PTS) that allows a player to play one or more casino games at the EGM. A non-limiting example of the second game management system may correspond to a sports wagering system. In this particular situation, a player may be allowed to play a traditional casino game at the EGM while also betting and tracking bets placed on sports events (or other wagerable events). Each of the first game management system and second game management system may have its own player accounts, data formatting requirements, protocols, etc. Creation or enrollment of a player account at each game management system may require different types of information, but some of the information required for a player account in one game management system may also be required for a player account in the other game management system. Thus, a single player may be represented or recognized by the first game management system by a first player identification number or player ID while simultaneously being represented or recognized by the second game management system by a second player identification number or player ID that is different from the first player identification number or player ID. Enrollment of a player with the first game management system and second game management system may require the player to provide certain types of information to one or both game management systems.

Embodiments of the present disclosure contemplate an EGM that allows the player to place sports wagers at the EGM. Additionally, players can watch live sporting events and play casino games via the EGM. Regulations in most market require various levels of monetary tracking. A player can wager on sports anonymously but will have very low limits to meet the regulations. It is, therefore, desirable for the player to have a sports wagering account to use at the EGM. With a sports wagering account, the monetary limits can be tracked for the player and therefore the limits are greatly increased. This is better for the player and for the casino.

Embodiments of the present disclosure enable a player to simply sit down at the EGM and create an account in privacy and without the need to stand in line at a kiosk or service desk. Most regulations require that a player visit the physical casino property to create the sports wagering account. Embodiments of the present disclosure work in accordance with those rules.

In some embodiments, an anonymous player may have some predetermined wagering limit such as $100 per wager. This will help keep daily wagering below the regulatory limits for anonymous play. When the player is known, the limits may be increased greatly (e.g., by an order of magnitude or more) depending on the event and the configuration at the property. Additionally, there are regulations on redeeming tickets when the player is anonymous versus the player being known. The known player experience is considered more desirable for the casino operator and the player.

Today a player can only get a player account by going to the sports wagering desk, which may require the player to stand in line. At the sports wagering desk, the player provides the necessary information to uniquely identify the player such as name, address, social security number, etc. The desk then creates a player account, on behalf of the player, with the sports wagering system.

It is important to understand that an EGM may be connected to two different host systems (e.g., game management systems). One system may be the sports wagering system and the other may be the traditional slot accounting system. This division of systems may occur because the EGM allows the player to both place sports wagers and place traditional slot machines bets at the same time. The player likely has a slot accounting system account and associated player tracking card. It is desirable for the player to have a single card for both accounts.

The EGM, in some embodiments, may be equipped with a single interface (e.g., a SMIB with a card reader). In some embodiments, this SMIB will read the player's slot accounting number and communicate with the slot accounting system exactly the way slot machines do today. There are various methods for the EGM to acquire an account number from the player card in the SMIB. Such methods allow the EGM to learn one or more numbers on the player tracking card.

The sports wagering system can also allow the player to place sports wagers from a mobile device using the sports wagering account.

In some embodiments it is possible for the player to have two separate cards, one for slot play and the other for sports wagering.

Embodiments of the present disclosure allow the player to create a new sports wagering account at the EGM. This may require the EGM to gather some identifying information about the player.

In one embodiment, the player does not present a player tracking card. Rather, the player simply uses the EGM software and user interface to create a sports wagering account. The system could show the player the unique account number, but it is also possible that the system asks the player to choose a username, password, or PIN (of any combination). The player can then use those credentials to log into an EGM or mobile device to place a sports wager.

In one embodiment, the EGM asks the player to use the EGM camera to take a picture of the player's driver's license. This image and information may be associated with the account.

In one embodiment, the EGM may ask the player to insert their driver's license into the bill validator, which can then scan the driver's license, and return it to the player after the scan has occurred. Information from the driver's license may be extracted and used to create a player account with the sports wagering system. In some embodiments, the EGM may capture an image of the driver's license using a camera or the like mounted to the EGM.

In one embodiment, the EGM asks the player to use the EGM camera to take a picture of the player's face. This image and information is associated with the account.

In one embodiment, the EGM asks the player to provide some other biometrics (e.g., finger print, retinal scan, etc.) to associate with the account.

In some embodiments the information, pictures or biometrics are entered into the player's mobile device and then that information is wirelessly transmitted to the EGM. Upon receiving such information from the player's mobile device, the EGM may provide some or all of the collected information to the sports wagering system to create a sports wagering account for the player.

In some embodiments, the player may need to accept or decline an agreement that explains the rules of the sports wagering account and any limitations of the account. After enrollment is complete, the EGM, or a linked back-end system, could transmit a virtual or electronic player tracking card to the player. This could be sent to a mobile application on the player's mobile device, sent over email, SMS/TXT, etc. In one embodiment, the virtual card could be an NFC or QR code-enabled pass that can be added to the player's mobile wallet.

At a later time, it is possible that the player visits the sports desk and requests a physical card for the account. The player could present some information such as the username and password along with a driver's license.

In some embodiments the player does not necessarily need to insert a physical player tracking card, but rather presents the card wirelessly to the SMIB or EGM. Similar flows as described above may be followed except that the player account number or card number comes from a mobile device instead of a physical player card.

In embodiments where the player presents a slot card to the EGM, additional steps to those described above may be followed. In one embodiment, the player is allowed to create the sports wagering account using an existing slot accounting card. The process may require that the player insert the slot accounting player card into the EGM at some point. The EGM software learns the player account number or player tracking card number. The EGM may then communicate with the sports wagering system to create a new sports wagering account. At this point, the player has two accounts (e.g., a sports wagering account and a traditional slot account). The sports wagering system or some system component now associates the two accounts together. The player can now use the single player card at the EGM and simultaneously log into both accounts with a single card.

In one embodiment, the sports wagering system learns all of the players information from the player tracking system. The sports wagering system can learn the player's name, address, phone numbers, social security numbers, etc. In one embodiment, the sports wagering system learns this information from the player tracking system. It is possible that the EGM displays the information to the player for confirmation and possibly to alter the information.

In some embodiments, the sports wagering system will not communicate with the slot system but will rather request that the player provide all of the required enrollment information (e.g., first name, last name, address information, date of birth, social security number, driver's license information, etc). Of course, the sports wagering system could learn some information by communicating directly with the slot accounting system and other information from the player input at the time of account creation. The sports wagering system could also ask the player for some information that is used to confirm that they own the referenced account. As an example, the player may be required to enter the last 4 digits of their social security number and the sports betting system can leverage this information to confirm the entered data against the data already in the slot system.

In either embodiment, the player may need to accept or decline an agreement that explains the rules of the sports wagering account and any limitations of the account.

In one embodiment, the player can enter the username, password or other credentials for the sports wagering account into the sports wagering application on the mobile device and the information or the account number for the player is wirelessly transferred to the EGM.

As described herein, in one embodiment, the player can wirelessly transmit the sports wagering account information to the mobile phone and mobile sports wagering application.

In some embodiments, the player may log into the EGM using a physical card or mobile application.

In one embodiment, the player logs into the EGM using the player mobile application for sports wagering. This player mobile application wirelessly transmits the sports wagering account information to the EGM. The EGM learns the slot player tracking number from the sports wagering system because the sports wagering system (or other system component) has associated the sports wagering account number with the slot player tracking account number.

Some embodiments of an EGM may be provided with two card readers. One reader is the traditional slot accounting SMIB. The other reader is connected to the EGM processor using a serial data interface (e.g., a USB) or other technology. It is possible in this configuration for the player to still create a sports wagering account at the EGM. The player could enter the information and create the account. Casino personnel could then deliver the card to the player after the account is created.

In another embodiment, the player logs into the sports system using the username and password for the sports system and the player card from the traditional slot accounting system. These and other aspects of the present disclosure will now be described with further reference to the figures.

Gaming System

With reference initially to FIG. 1, details of an illustrative gaming system 100 will be described in accordance with at least some embodiments of the present disclosure. The components of the system 100, while depicted as having particular instructions and devices, are not necessarily limited to the examples depicted herein. Rather, a system according to embodiments of the present disclosure may include one, some, or all of the components depicted in the system 100 and does not necessarily have to include all of the components in a single device.

The gaming system 100 is shown to include one or more communication networks 104 that interconnect and facilitate machine-to-machine communications between one or multiple gaming machines 108 and one or more game management systems 116, 124. It should be appreciated that a communication network 104 may correspond to one or many communication networks without departing from the scope of the present disclosure. In some embodiments, the gaming machines 108 and game management systems 116, 124 may be configured to communicate using various nodes or components of a communication network 104. The communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a cellular network, and any other type of packet-switched or circuit-switched network known in the art. In addition, it can be appreciated that the communication network 104 need not be limited to any one network type, and instead may be comprised of a number of different networks and/or network types. Moreover, the communication network 104 may comprise a number of different communication media such as coaxial cable, copper cable/wire, fiber-optic cable, antennas for transmitting/receiving wireless messages, and combinations thereof.

In some embodiments, the gaming machines 108 may be distributed throughout a single property or premises (e.g., a single casino floor) or the gaming machines 108 may be distributed among a plurality of different properties. In a situation where the gaming machines 108 are distributed in a single property or premises, the communication network 104 may include at least some wired connections between network nodes. As a non-limiting example, the nodes of the communication network 104 may communicate with one another using any type of known or yet-to-be developed communication technology. Examples of such technologies include, without limitation, Ethernet, SCSI, PCIe, RS-232, RS-485, USB, ZigBee, WiFi, CDMA, GSM, HTTP, TCP/IP, UDP, etc.

The gaming machines 108 may utilize the same or different types of communication protocols to connect with the communication network 104. It should also be appreciated that the gaming machines 108 may or may not present the same type of game or wagering interface to a player 112. For instance, a first gaming machine 108 may correspond to a gaming machine that presents a slot game to the player 112, the second gaming machine 108 may correspond to a sports betting terminal, and other gaming machines 108 may present other types of games or a plurality of different games for selection and eventual play by a player 112. It may be possible for the some of the gaming machines 108 to communicate with one another via a communication network 104.

A gaming machine 108 may correspond to a type of device that enables player interaction in connection with making wagers, communicating, watching live competitive contests, and/or playing games of chance. For instance, the gaming machines 108 may correspond to a type of device that enables a first player 112 to interact with a second player 112 at respective gaming machines 108. In other embodiments, each player 112 may be enabled to play a game individually at a gaming machine 108.

As will be discussed in further detail herein, a player 112 may be allowed to carry a first credential 132 and/or a second credential 136. The first credential 132 may be similar or identical in format or form factor as the second credential 136, but this is not a requirement. As an example, the first credential 132 may correspond to a mobile device or the like whereas the second credential 136 may correspond to a player loyalty card or the like. Alternatively or additionally, the first credential 132 may correspond to a first player loyalty card whereas the second credential 132 may correspond to a second, different, player loyalty card of the same or different form factor. Although the player 112 is depicted as carrying two physically separate credentials 132, 136, it should be appreciated that the player 112 may carry a single credential that is readable by multiple readers of a gaming machine 108. Presentation of one or both credentials 132, 136 to a gaming machine 108 may enable the player 112 to create a player account, login or register their presence at a particular gaming machine 108 with respect to a first game management system 116 and/or second game management system 124, or perform other functions with respect to a particular game management system. As will be discussed in further detail herein, one or more of the credentials may be used to log the player 112 into one game management system (e.g., the first game management system 116) in addition to enabling the player 112 to create an account with another game management system (e.g., the second game management system 124). The player 112 does not necessarily need to carry two credentials 132, 136.

In some embodiments, a player 112 may login to the first game management system 116 by presenting the first credential 132 to a gaming machine 108, which causes components of the gaming machine 108 to initiate a login process with the first game management system 116 on behalf of the player 112. Similarly, the player 112 may login to the second game management system 124 by presenting the second credential 136 to the gaming machine 108, which causes components of the gaming machine 108 to initiate a separate login process with the second game management system 124 on behalf of the player 112. As described herein, the creation of a player account with one game management system may require different types of information as compared to the information required to create a player account with another game management system. In some embodiments, information used to log a player 112 into one game management system (e.g., the first game management system 116) may be used, at least in part, to also create a player account with another game management system (e.g., the second game management system 124).

In some embodiments, the first game management system 116 may correspond to a system used within a casino to manage slot games, video poker games, bingo games, keno games, or the like that are played on one or more of the gaming machines 108. In some embodiments, the second game management system 124 may correspond to a system used within the casino to manage sports wagers placed by players 112 either at a sports desk or at a gaming machine 108. Although not depicted, it should be appreciated that both game management systems 116, 124 may include one or multiple servers that execute instructions in connection with managing the games or wager capabilities made available at the gaming machines 108. In some embodiments, the first game management system 116 operates independent of the second game management system 124. In some embodiments, player 112 activities registered with the first game management system 116 may not necessarily be registered with the second game management system 124. For instance, if the player 112 places a bet on a game of chance, bets a certain amount in a slot game or video poker game, plays credits in connection with a slot game or video poker game, wins during play of the game of chance, or the like, such player 112 activities may be registered by the first game management system 116 and not by the second game management system 124. Conversely, if the player 112 places a wager on a sporting event, is viewing a sporting event at a gaming machine 108, or an outcome of a particular sporting event results in the player 112 winning a previously-placed wager, then such player 112 activities may be registered by the second game management system 124 and not by the first game management system 116. As another example, if the player 112 completes a login process with the first game management system 116, the player 112 has not necessarily completed a login process with the second game management system 124 until the player 112 presents an appropriate credential 132, 136 to an appropriate reader of the gaming machine 108. The act of logging in to either the first game management system 116 or second game management system 124 may enable the player 112 to receive additional playing benefits (e.g., loyalty benefits), maintain or track wager activity, purchase additional wager or gameplay credits, and the like. Furthermore, if a player account does not exist for the player 112 within a particular game management system, then the gaming machine 108 may be configured to facilitate the creation of a player account for the player 112 within that particular game management system. The creation of the player account within any particular game management system may or may not utilize at least some of the information also used to log the player 112 into their other player account established with the other game management system.

As shown in FIG. 1, the first game management system 116 may utilize one or more first databases 120 to track first player 112 activity with respect to the gaming machine 108. For instance, if the first game management system 116 corresponds to a PTS, then games played at the gaming machines 108, credits wagered in a slot game, credits won in a slot game, etc. may correspond to the types of first player 112 activities tracked by the first game management system 116. Similarly, the second game management system 124 may utilize one or more second databases 128 to track second player 112 activity with respect to the gaming machine 108. For instance, if the second game management system 124 corresponds to a sports wagering system, then wagers placed on sporting events, results of wagers placed, and games being watched at the gaming machine 108 may correspond to the types of second player 112 activities tracked by the second game management system 124. The databases 120, 128 may be used to store records for player 112 activity with respect to the designated game management system 116, 124.

The illustrative first database 120 is shown to include data fields used to track player 112 activity with respect to games of chance played at a gaming machine 108. The illustrative, but non-limiting, data fields may include a tag ID field, a player information field 144, a player ID field 148, a login status field 152, and a gameplay status field 156. The tag ID field 140 may correspond to a field used to store an identification number or string that uniquely identifies a first credential 132 carried by the player 112 from among other cards used by other players. The format of the identification number or string used to uniquely identify the first credential 132 may be specific to the first game management system 116 and can correspond to any alphanumeric sequence or any length (e.g., 1 bit, 2 bits, . . . N bits).

The player information field 144 may be used to store information describing a player 112 with respect to the first game management system 116. For instance, the player information field 144 may be used to store information describing whether or not the player 112 has a loyalty status with a particular casino, whether the player 112 is a VIP within the casino, historical gameplay information for the player 112 (e.g., casino visit times, durations, winnings, losses, etc.). In some embodiments, the information maintained in the player information field 144 may be unique to particular games played by the player 112 at gaming machines 108 and may describe the types of games historically played by the player 112.

The player ID field 148 may be used to store an identification number or string that uniquely identifies the player 112 from among other players. As an example, the player ID field 148 may store a player loyalty identification number and may have a particular format associated therewith (e.g., a required length, a number of bits, permissible symbols, etc.) In some embodiments, the player ID assigned to a player 112 may be uniquely assigned by a casino that administers the first game management system 116.

The login status field 152 may be used to store a current status of player 112 login with respect to the first game management system 116. For instance, the login status field 152 may indicate whether or not a player 112 is currently logged in and, if the player 112 is currently logged in, an identification of the gaming machine 108 at which the player 112 is currently logged in. The login status field 152 may also be used to store historical login information for the player 112 with respect to the first game management system 116.

The gameplay status field 156 may be used to store information describing a player's 112 gameplay status at a gaming machine 108. For instance, the gameplay status field 156 may store information describing wager history, credit in information, credit out information, duration of a gaming session with a particular gaming machine 108, and other information that is known to be tracked by the first game management system 116.

The illustrative second database 128 is also shown to include data fields used to track player 112 activity with respect to the second game management system 124. Information used to establish the player account within the second database 128 may not necessarily include all of the information used to establish the player account within the first database 120. However, certain information from the first database 120 may be used to establish a player account within the second database 128. That is, at least some data within the first database 120 for a player account may also be stored, as a separate data instance, within the second database 128 for a player account established for the same player 112. The types of information tracked by the second game management system 124 may be similar to the types of information tracked by the first game management system 116; thus, some data fields maintained in the second database 128 may be similar to the data fields maintained in the first database 120. However, the second game management system 124 may not necessarily utilize the same data formats as the first game management system 116. Therefore, the format of data maintained in the second database 128 may be different from the format of data maintained in the first database 120, even if the type of data is similar. For instance, the data format for the tag ID field in the second database 128 may be different from the data format for the tag ID field in the first database 120. Likewise, the data format for the player ID field in the second database 128 may be different from the data format for the player ID field in the first database 120. In some embodiments, at least some additional information may be required to establish a player account within the second database 128 as compared to the information required to establish a player account within the first database 120.

The second database 128 is further illustrated to include different data fields from the first database 120. For instance, the second database 128 may include a wager status field 160 in the event that the second game management system 124 corresponds to a sports wagering system. The wager status field 160 may be used to store information describing wagers placed by a player 112, odds on wagers placed by the player 112, whether a wager was placed at a gaming machine 108, whether a winning wager has been paid and, if so, whether the winning wager was paid at a gaming machine 108, and any other information describing sports wagers placed by the player 112.

As mentioned above, a gaming machine 108 may include any type of known device such as a slot machine, a sports wagering terminal, an electronic table game (e.g., video poker), a skill-based game, etc. The gaming machine 108 can be in the form of an EGM, virtual gaming machine, video game gambling machine, etc.

Gaming Machine

Figure 2:
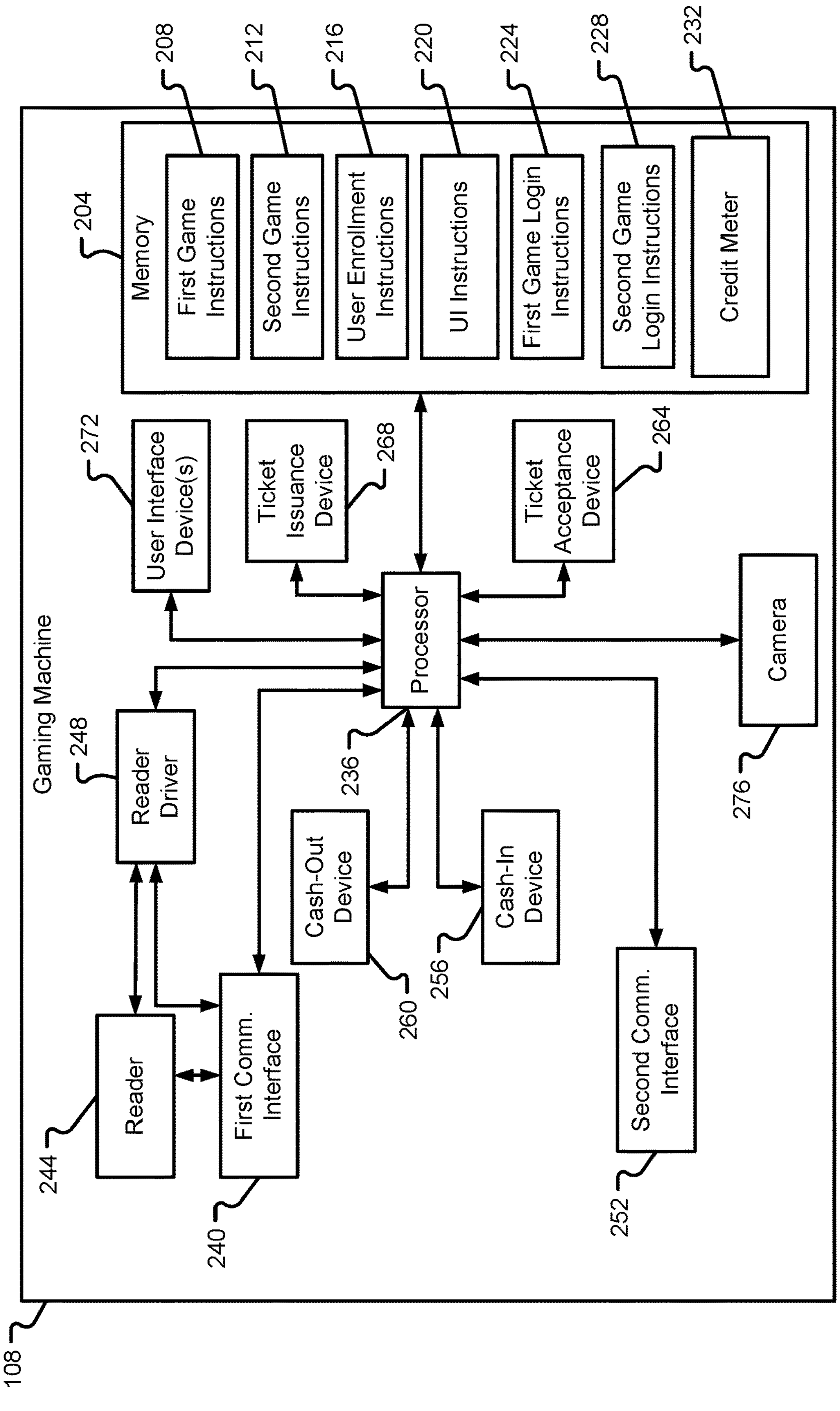
FIG. 2 is a block diagram depicting details of a gaming machine in accordance with embodiments of the present disclosure.

With reference now to FIG. 2, additional details of a gaming machine 108 will be described in accordance with at least some embodiments of the present disclosure. While depicted as a gaming machine 108, it should be appreciated that some or all of the components of a single gaming machine 108 may be distributed across multiple gaming machines 108 (of the same or different type) without departing from the scope of the present disclosure. It should also be appreciated that one or more features of a gaming machine 108 may be provided in a player's 112 mobile device (e.g., such as the first credential 132) without departing from the scope of the present disclosure.

The gaming machine 108 is shown to include memory 204, a processor 236, a first communication interface 240, a reader 244, a reader driver 248, a second communication interface 252, a cash-in device 256, a cash-out device 260, a ticket acceptance device 264, a ticket issuance device 268, one or more user interface devices 272, and a camera 276 (which may be incorporated as part of the reader 244 without departing from the scope of the present disclosure).

The processor 236 may include one or multiple computer processing devices. In some embodiments, the processor 236 may include a microprocessor, a CPU, a microcontroller, or the like. The processor 236 may also be configured to execute one or more instructions stored in memory 204.

The memory 204 may include one or multiple computer memory devices that are volatile or non-volatile. The memory 204 may be configured to store instructions that enable player 112 interaction with the gaming machine 108, that enable the gaming machine 108 to interact with the first game management system 116, that enable the gaming machine 108 to interact with the second game management system 124, that enable the player 112 to create a player account with the first game management system 116 and/or second game management system 124, and that enable the gaming machine 108 to provide a player 112 with the ability to login to both the first game management system 116 and/or second game management system 124. Examples of instructions that may be stored in the memory 204 include first game instructions 208, second game instructions 212, user enrollment instructions 216, User Interface (UI) instructions 220, first game login instructions 224, and second game login instructions 228.

The first game instructions 208, when executed by the processor 236, may enable the gaming machine 108 to facilitate one or more games of chance or skill and produce interactions between the player 112 and the game of chance or skill. In some embodiments, the first game instructions 208 may include subroutines that present one or more graphics to the player 112 via a user interface, subroutines that calculate whether a particular game wager has resulted in a win or loss during the game of chance or skill, subroutines for determining payouts for the player 112 in the event of a win, subroutines for exchanging communications with the first game management system 116 via the first communication interface 240, and any other subroutine or set of instructions that facilitate gameplay at or in association with the gaming machine 108.

Similarly, the second game instructions 212, when executed by the processor 236, may enable the gaming machine 108 to present games or information to the player 112 on behalf of the second game management system 124. In some embodiments, the second game instructions 212 may include instructions that enable the player 112 to place wagers on sporting events, watch live sporting events via the gaming machine 108, track a status of wagers placed on sporting events, track a status of events occurring in sporting events, and the like. In a situation where the second game management system 124 does not correspond to a sports wagering system, then the second game instructions 212 may be configured to provide a game experience to the player 112 similar to the first game instructions 208.

The user enrollment instructions 216, when executed by the processor 236, may enable the gaming machine 108 to enroll a player 112 with the first game management system 116 and/or second game management system 124. In some embodiments, the user enrollment instructions 216 may enable the gaming machine 108 to automatically launch a user enrollment process with one or both game management systems 116, 124 when a player 112 presents a credential 132, 136 to the gaming machine 108. Alternatively or additionally, the user enrollment instructions 216 may enable the gaming machine 108 to facilitate a process whereby the player 112 creates a player account with one game management system based on information stored on a credential 132, 136, based on information already stored in connection with a different player account at another game management system, and/or based on additional information input by the player 112 to the gaming machine 108.

The UI instructions 220, when executed by the processor 236, may enable the gaming machine 108 to render or present various information and prompts to the player 112 via one or more user interface devices of the gaming machine 108. For instance, the UI instructions 220 may enable the gaming machine 108 to present prompts to the player 112 via the one or more user interface devices 272. Examples of user interface device(s) 272 include, without limitation, user input devices (e.g., buttons, microphones, touch-sensitive sensors, optical sensors, motion sensors, proximity sensors, etc.), user output devices (e.g., display screens, lights, speakers, haptic feedback devices, etc.), and combination user input/output devices (e.g., touch-sensitive displays, etc.). The UI instructions 220 may also include drivers for the user interface device(s) 272 and/or other firmware that enables control of the user interface device(s) 272 in accordance with inputs received from other instructions stored in memory 204.

The first game login instructions 224, when executed by the processor 236 and/or reader driver 248 and/or first communication interface 240, may enable the gaming machine 108 to initiate a login process for a player 112 with the first game management system 116. In some embodiments, the login process for the first game management system 116 may be initiated automatically in response to a card read event occurring at the reader 244. In some embodiments, the login process for the first game management system 116 may be initiated in response to registering a first credential read event at the reader 244. Alternatively or additionally, the login process for the first game management system 116 may be initiated in response to reading data from the first credential 132 and confirming a validity of the data read from the first credential 132. Embodiments are contemplated where the login process for the first game management system 116 is initiated by the first communication interface 240 and without any intervention or assistance by the processor 236.

The second game login instructions 228, when executed by the processor 236, may enable the gaming machine 108 to initiate a login process for a player 112 with the second game management system 124. In some embodiments, the login process for the second game management system 124 may be initiated automatically in response to a card read event occurring at the reader 244. In some embodiments, the login process for the second game management system 124 may be initiated in response to registering a second credential read event at the reader 244. Alternatively or additionally, the login process for the second game management system 124 may be initiated in response to reading data from the second credential 136 and confirming a validity of the data read from the second credential 136.

The credit meter 232 may correspond to a device or collection of devices that facilitates a tracking of wager activity or available wager credits at the gaming machine 108. Such credits may be made available for wagers or bets placed on a game managed by the first game management system 116 and/or a game or event managed by the second game management system 124. In some embodiments, the credit meter 232 may be used to store or log information related to various player 112 activities and events that occur at the gaming machine 108. The types of information that may be maintained in the credit meter 232 include, without limitation, player information, available credit information, wager amount information, and other types of information that may or may not need to be recorded for purposes of accounting for wagers placed at the gaming machine 108 and payouts made for a player 112 during a game of chance or skill played at the gaming machine 108. In some embodiments, the credit meter 232 may be configured to track coin-in activity, coin-out activity, coin-drop activity, jackpot paid activity, bonus paid activity, credits applied activity, external bonus payout activity, ticket/voucher in activity, ticket/voucher out activity, timing of events that occur at the gaming machine 108, and the like. Some or all of the data within the credit meter 232 may be reported to the first game management system 116 and/or second game management system 124. As an example, the number, value, and timing of wagers placed by a particular player 112 and payouts on such wagers may be reported.

The cash-in device 256 may include a bill acceptor, a coin acceptor, a chip acceptor or reader, or the like. In some embodiments, the cash-in device 256 may also include credit card reader hardware and/or software. The cash-out device 260 may operate and issue cash, coins, tokens, or chips based on an amount indicated within the credit meter 232. In some embodiments, the cash-out device 260 may include a coin tray or the like and counting hardware configured to count and distribute an appropriate amount of coins or tokens based on a player's 112 winnings or available credit within the credit meter 232.

The gaming machine 108 may also be provided with a ticket acceptance device 264 that is configured to accept or scan physically-printed tickets/vouchers and extract appropriate information therefrom. In some embodiments, the ticket acceptance device 264 may include one or more machine vision devices (e.g., a camera, IR scanner, optical scanner, barcode scanner, etc.), a physical ticket acceptor, a shredder, etc. The ticket acceptance device 264 may be configured to accept physical tickets and/or electronic tickets without departing from the scope of the present disclosure. An electronic ticket/voucher may be accepted by scanning a one-dimensional barcode, two-dimensional barcode, or other type of barcode or quick response (QR) code displayed by a player's 112 mobile communication device 144, for example.

The ticket issuance device 268 may be configured to print or provide physical tickets/vouchers to players 112. In some embodiments, the ticket issuance device 268 may be configured to issue a ticket/voucher consistent with an amount of credit available to a player 112, possibly as indicated within the credit meter 232.

As mentioned above, the user interface device(s) 272 may correspond to any type of mechanical or software-based input and/or output device. In some embodiments, the user interface device(s) 272 may be provided on a common panel or portion of the gaming machine 108 and may be used to initiate a predetermined function in response to being pressed by the player 112. In addition to the examples of user interface devices 272 described above, it should be appreciated that a user interface device 272 may alternatively or additionally take the form of one or more depressible buttons, a lever or "one armed bandit handle," etc.

The illustrative gaming machine 108 is also shown to include a first communication interface 240 and a second communication interface 252. In the depicted embodiment, the reader 244 is in direct communication with the first communication interface 240 whereas the the second communication interface 252 may or may not be directly connected to the reader 244, but rather may be directly connected to the processor 236. In some embodiments, the first communication interface 240 may correspond to a component of the gaming machine 108 that has the reader 244 integrated therewith. As a more specific but non-limiting example, the first communication interface 240 may correspond to a SMIB and the reader 244 may be integrated with the SMIB. In some embodiments, the first communication interface 240 communicates with the processor 236 using a Slot Accounting System (SAS) protocol. The first communication interface 240 may enable the gaming machine 108 to interact with the first game management system 116. All elements of the gaming machine 108 may be considered to be coupled to one another, regardless of whether or not such coupling is direct or indirect. For instance, the processor 236 may be considered to be coupled to the reader 244 via the first communication interface 240 and the second communication interface 252 may be considered coupled to the reader 244 via the processor 236. In other words, "coupling" as used herein does not necessarily require a direct communication between components.

In some embodiments, the second communication interface 252 may correspond to a physically separate component of the gaming machine 108 that enables the gaming machine 108 to interact with the second game management system 124. The second communication interface 252 may or may not necessarily have similar hardware as the first communication interface 240. Also, the first communication interface 240 and second communication interface 252 may utilize different communication protocols, different port types, and/or different data formatting rules to communicate with the first game management system 116 and second game management system 124, respectively.

The nature of the first communication interface 240 and/or second communication interface 252 may depend upon the protocol and/or networking requirements of the first game management system 116 and/or second game management system 124. Examples of a suitable communication interface 240, 252 include, without limitation, an Ethernet port, a USB port, an RS-232 port, an RS-485 port, a NIC, an antenna, a driver circuit, a modulator/demodulator, etc. One or both communication interfaces 240, 252 may include one or multiple different network interfaces depending upon whether one or multiple network connections are required to facilitate interactions with the first game management system 116 or second game management system 124. For instance, the gaming machine 108 may be provided with both a wired network interface and a wireless network interface without departing from the scope of the present disclosure. In some embodiments, the communication interface(s) 240, 252 may include different communications ports that interconnect with various input/output lines.

The reader 244 may be configured to read credentials of different types. For instance, the reader 244 may be configured to read the first credential 132 or similar cards that operate with a similar protocol or utilize a similar data format. The reader 244 may also be configured to read cards or credentials of a second type (e.g., the second credential 136), which may be the same or different from the credentials of the first type that are read by the reader 244. For instance, the reader 244 may be configured to read the second credential 136 or similar cards that operate with a similar protocol or utilize a similar data format.

As will be discussed in further detail herein, the format or form factor of a credential 132, 136 should not be limited to any particular type of format or form factor. Examples of suitable form factors that may be used for one or both of the first credential 132 and second credential 136 include, without limitation, magstripe cards, chip-based cards, contactless/wireless cards, key fobs, mobile communication devices, optically-readable cards, or the like. It should be appreciated that one or both of the credentials 132, 136 may be capable of being read by a reader 244 when brought within a predetermined distance of the reader 244 (e.g., if the reader 244 includes an antenna and is utilize a contactless communication protocol like Near Field Communications (NFC) or Bluetooth). Alternatively or additionally, one or both of the credentials 132, 136 may be capable of being read by a reader 244 when inserted to a slot of a card reader 244 or swiped through a card reader 244. To the extent that the form factor of a credential 132, 136 can vary and is not limited, it should be appreciated that the reader 244 may be provided with any number of hardware and/or software components to enable interactions with a credential 132, 136. More specifically, each a reader 244 may include one or multiple readers, each of which may be provided with appropriate hardware and/or software components to enable the reader 244 to extract/read data that is stored on a credential 132, 136.

In some embodiments, when the reader 244 is used to read data from a first credential 132, the data read from the first credential 132 may be provided directly to the first communication interface 240. The first communication interface 240 may be configured to provide some or all of the data from the first credential 132 directly to the first game management system 116 (e.g., without providing the data first to the processor 236). The first communication interface 240 may then provide some or all of the data from the first credential 132 to the processor 236 or may inform the processor 236 of a card read event. In some embodiments, the first communication interface 240 may not necessarily provide any data from the first credential 132 to the first game management system 116. Rather, upon reading data from the first credential 132, the first communication interface 240 may automatically initiate a login process for the player 112 that presented the first credential 132 to the reader 244. The login process may involve sending one or more communications to the first game management system 116, but such communications may not necessarily include data read from the first credential 132.

In some embodiments, when reader 244 is used to read data from a second credential 136 (or possibly the first credential 132), the data read from the credential 132, 136 may be provided to the processor 236. In response to the read event and in response to receiving the data read from the credential 132, 136, the processor 236 may initiate a user enrollment process with the second game management system 124, by executing the user enrollment instructions 216. The enrollment process with the second game management system 124 may or may not include transmitting some or all of the data read from the first credential 132 and/or second credential 136 to the second game management system 124. As part of communicating with the second game management system 124, the processor 236 may utilize the second communication interface 252.

Methods

With reference now to FIGS. 3-6, various methods will be described in accordance with at least some embodiments of the present disclosure. It should be appreciated that the disclosed methods may be performed by one, some, or all of the devices depicted and described herein. Said another way, any device within the system 100 may be used to perform some or all of a method depicted and described herein. Moreover, although certain steps are depicted as being performed in a certain order or in connection with a particular method, it should be appreciated that any method step depicted and described herein may be performed in combination with any other method step depicted and described herein.

Figure 3:
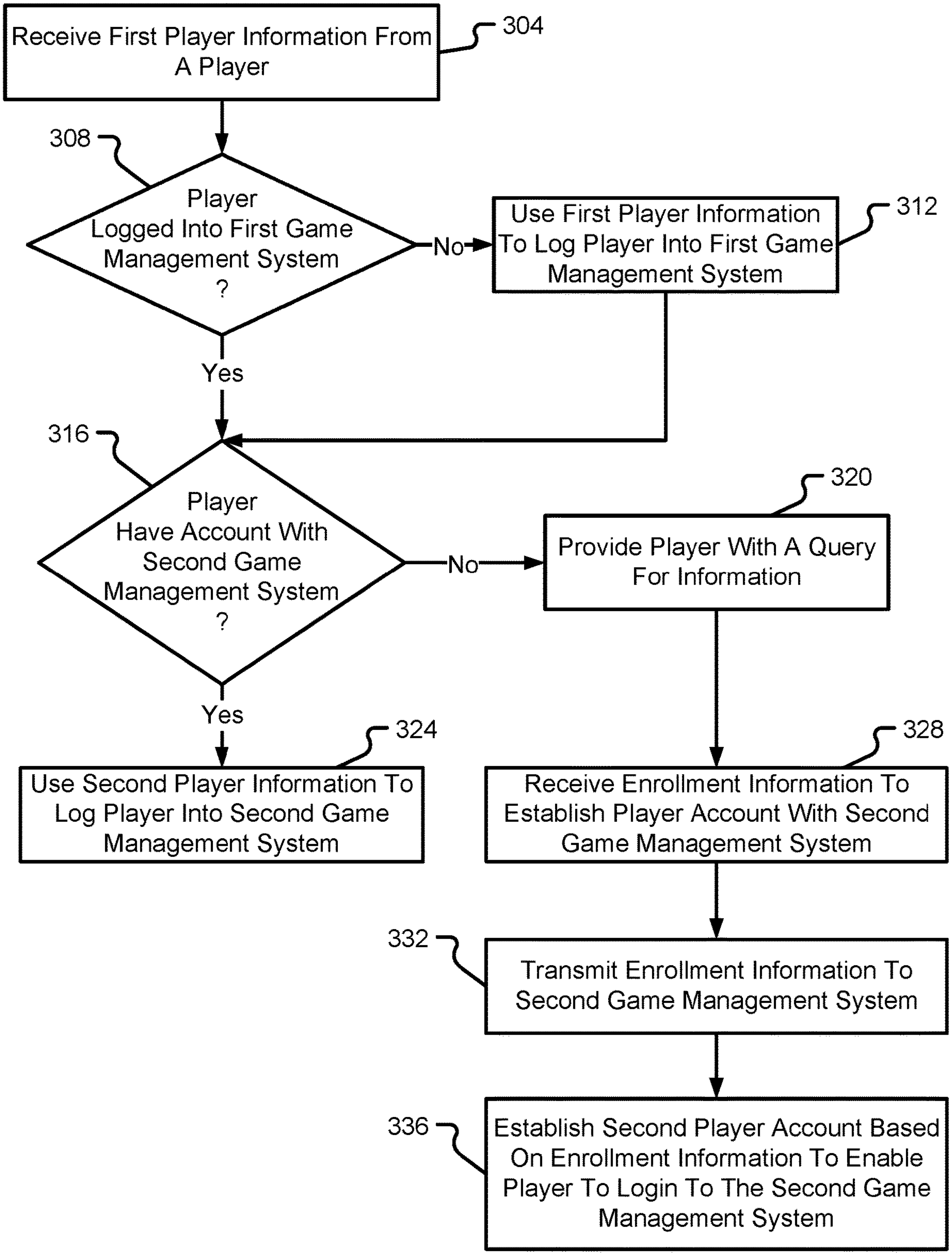
FIG. 3 is a flow diagram depicting a first method in accordance with embodiments of the present disclosure.

Referring initially to FIG. 3, a first method of enabling a player 112 to interact with multiple game management systems will be described in accordance with at least some embodiments of the present disclosure. The method begins by receiving first player information from a player 112 (step 304). The first player information may be received at the gaming machine 108 and/or at a player's mobile device (e.g., a credential 132). The first player information, in some embodiments, is received via a first credential 132 and may correspond to some or all of the information stored in connection with a player account for the player maintained at the first game management system 116.

The method continues by determining whether or not the player 112 is logged into the first game management system 116 (step 308). If this query is answered positively (e.g., the player 112 is already logged into the first game management system 116), then the method proceeds to step 316. However, if the query is answered negatively (e.g., the player 112 is not yet logged into the first game management system 116), then the method may continue with the gaming machine 108 using the first player information to log the player 112 into the first game management system 116 (step 312). Thereafter, the method may proceed to step 316.

At step 316 it is determined whether or not the player 112 has an existing account with the second game management system 124. If the player 112 already has an existing account with the second game management system 124, then the player 112 may be requested to provide second player information that is sufficient to log the player 112 into the second game management system 124 (step 324). It should be appreciated that the second player information (e.g., the information used in connection with the player's 112 account in the second game management system 124) may or may not match the first player information. In some embodiments, the first player information may be different from the second player information. In some embodiments, the first player information may include a player's 112 name, physical address, financial account information (e.g., a linked bank account or credit card), mobile phone number, email address, slot machine preferences, other game of chance preferences, username & password, and the like. In some embodiments, the second player information may include some or all of the first player information and may further include other additional information such as driver's license number, passport number, social security number, additional financial account information (e.g., line of credit information), username & password, and the like. Thus, in some embodiments, the first player information is a subset of the second player information. In some embodiments, only a portion of the first player information may be used as a subset of the second player information.

Referring back to the query of step 316, if the player 112 does not currently have an account with the second game management system 124, then the method may continue with the gaming machine 108 providing the player 112 with a query for information (step 320). The query may be generated based on execution of the user enrollment instructions 216 and may be presented to the player 112 with assistance of the UI instructions 220. The query may include a response for specific player information to supplement the first player information (e.g., a request for information to obtain all of second player information needed to enroll the player 112 with the second game management system 124). In other words, the query presented in step 320 may include a request for information sufficient to create a second player account for the player 112 within the second game management system 124. The query may specifically identify additional information not included in the first player information that is still required to create the second player account or the query may identify all of the second player information, regardless of whether or not the second player information is already included in the first player information and known to the gaming machine 108.

The method may then continue with the player 112 providing the gaming machine 108 with enrollment information (step 328). The enrollment information may include the first player information, but may also include information provided to the gaming machine by the player 112 in response to the query. In some embodiments, the enrollment information may include a combination of the first player information (e.g., information that was received from the first credential 132 presented to the gaming machine 108) in addition to additional information provided to the gaming machine 108 in response to the query. Various types of additional information and methods of delivering such additional information to the gaming machine 108 will be described in further detail herein.

The method may continue with the gaming machine 108 transmitting the enrollment information to the second game management system 124 via the second communication interface 252 (step 332). The enrollment information may include a collection of the first player information and additional information. In some embodiments, however, it may be possible that the enrollment information includes some or all of the first player information. In some embodiments, the enrollment information may include just the first player information. In some embodiments, the enrollment information may also include information that enables the second game management system 124 to obtain information from the first game management system 116 (e.g., server location information, hyperlinks, data references, etc.). The step of transmitting the enrollment information may also include transmitting one or multiple communication packets from the gaming machine 108 to the second game management system 124 via the communication network 104.

The method then continues with the second game management system 124 establishing the second player account based on the enrollment information received from the gaming machine 108 (step 336). The enrollment information used to establish the second player account may cause a data structure to be created within the second database 128 that specifically references the player 112, an identity of the player 112, and/or an alias of the player 112. The second player account and the information stored in the second database 128 may then be used by the player 112 to login to the second game management system 124 and receive the benefits associated with logging into the second game management system 124. The information used by the player 112 to login to the second game management system 124 may not necessarily include all of the second player information (e.g., the enrollment information used to establish the second player account). Rather, only a subset of the second player information may be needed to facilitate a login process.

Figure 4:
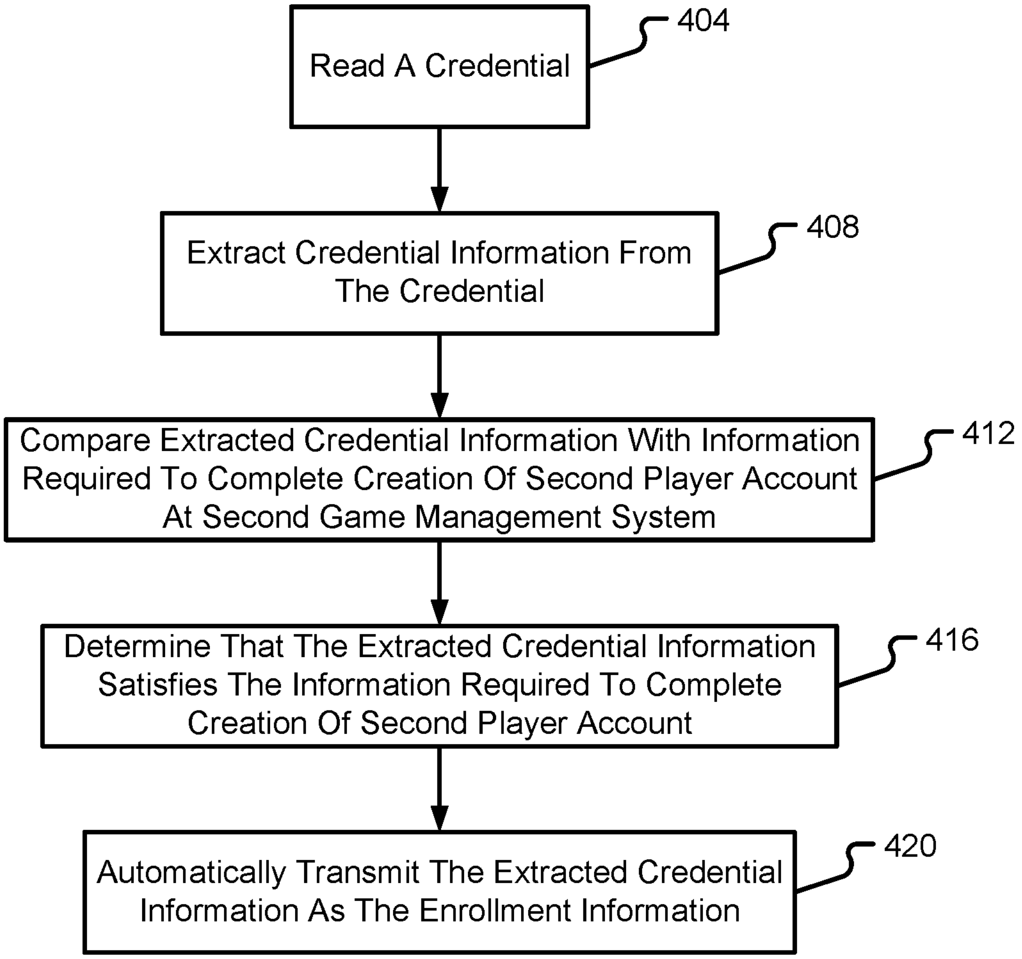
FIG. 4 is a flow diagram depicting a second method in accordance with embodiments of the present disclosure.

Referring now to FIG. 4, a second method will be described in accordance with at least some embodiments of the present disclosure. The method begins when a gaming machine 108 utilizes its reader 244 to read a credential 132, 136 being carried by a player 112 and presented by the player 112 to the gaming machine 108 (step 404). The way in which the credential 132, 136 is read by the reader 244 may depend upon the capabilities of the reader 244 and/or the capabilities of the credential 132, 136. For instance, if the credential 132, 136 includes a magstripe card, then the reader 244 may include a magstripe reader and the credential 132, 136 may be read when the credential 132, 136 is swiped through the reader 244. As another non-limiting example, if the credential 132, 136 includes a player's 112 mobile device, then data may be read from the credential 132, 136 when the credential 132, 136 is brought within a predetermined distance (e.g., a read distance) of the reader 244 and a contactless communication protocol (e.g., NFC, BLE, infrared, etc.) is used to wirelessly read data from the credential 132, 136. As yet another example, if the credential 132, 136 includes a physical identification document (e.g., passport, driver's license, etc.), then the reader 244 may extract the credential information from the credential 132, 136 by capturing an image of the credential 132, 136, performing a text recognition process on the image, and extracting data from the text recognized during the text recognition process.

The method continues with the gaming machine 108 extracting credential information from the credential 132, 136 (step 408). The information extracted from the credential may include first player information that is used in connection with establishing or using a first player account (e.g., a loyalty account) at the first game management system 116. In some embodiments, the information extracted from the credential 132, 136 may be decoded with an appropriate decoding unit. The extracted credential information may be analyzed by the gaming machine 108 to determine if the extracted credential information matches first player information or at least an expected format of first player information. Alternatively or additionally, the extracted credential information may be analyzed by the gaming machine 108 to determine if sufficient information has been received to login the player 112 with the first game management system 116.

The method may then continue with the gaming machine 108 utilizing the user enrollment instructions 216 to compare the extracted credential information with information (e.g., data fields) required to complete creation of a second player account with the second game management system 124 (step 412). If the gaming machine 108 determines that the extracted credential information satisfies the information required to complete creation of the second player account at the second game management system 124 (step 416), then the user enrollment instructions 216 may cause the gaming machine 108 to automatically transmit the extracted credential information to the second game management system 124 as the enrollment information (step 420). In other words, if the gaming machine 108 determines that the extracted credential information is enough to create a second player account (e.g., includes enough data to complete the second player information), then the gaming machine 108 may automatically transmit the extracted credential information that satisfies the second player information to the second game management system 124. In some embodiments, the gaming machine 108 may not be required to send all of the extracted credential information. Rather, only the extracted credential information that is required to complete the second player account may be transmitted. In this way, less than all of the extracted credential information may be transmitted to the second game management system 124.

Figure 5:
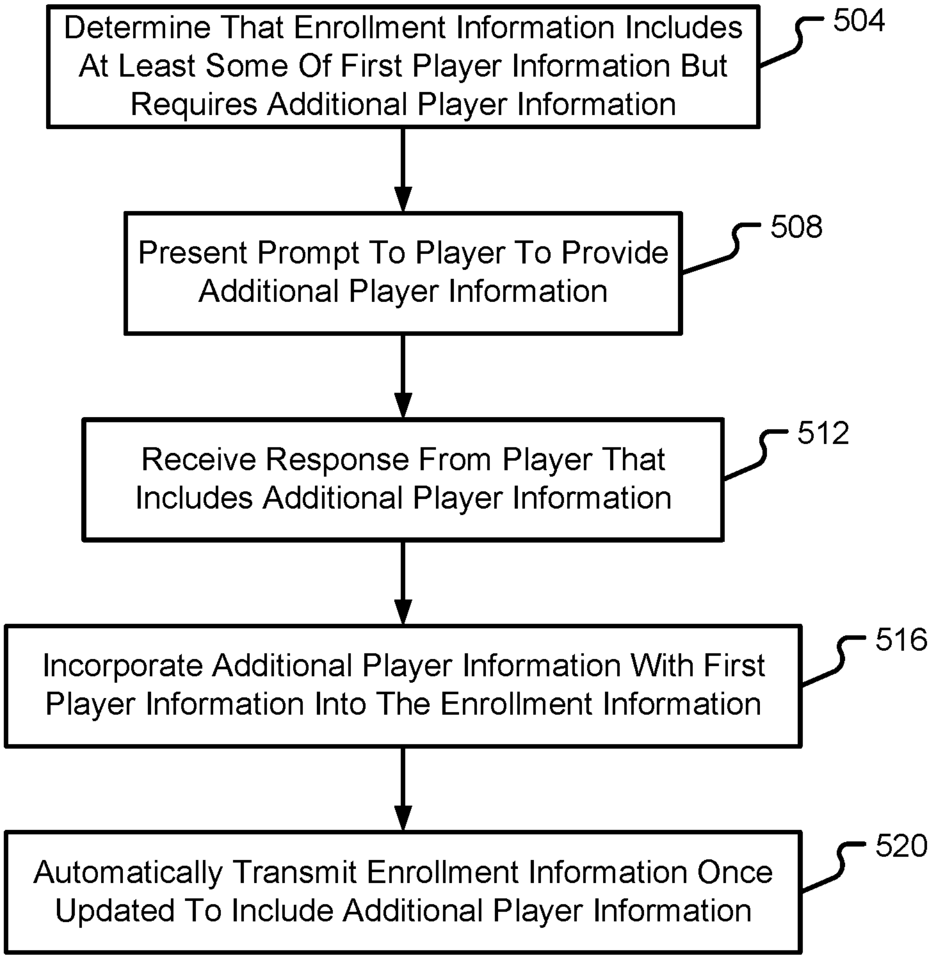
FIG. 5 is a flow diagram depicting a third method in accordance with embodiments of the present disclosure.

With reference now to FIG. 5, a third method will be described in accordance with at least some embodiments of the present disclosure. The method begins by determining that the enrollment information (e.g., information required to enroll the player 112 with the second game management system 124) includes at least some of the first player information but further requires additional player information (step 504). In some embodiments, the first player information may be received directly from the player 112 inputting the information at the user interface device(s) 272 or by reading data from a credential carried by the player 112. In some embodiments, the first player information may be read from a first credential 132 that is used by the player 112 to login to the first game management system 116.

In response to determining that the enrollment information includes at least some of the first player information but requires additional information, the method may continue with the gaming machine 108 presenting a prompt to the player 112 (step 508). The prompt may include a request for the player 112 to provide additional player information. The prompt may further include a description of the mechanisms by which the player 112 can provide the additional player information. For instance, the prompt may instruct the player 112 to present or display a credential 132, 136 to the gaming machine, to manually input information to the gaming machine 108, to capture an image of the player 112, or combinations thereof.

The method may then proceed with the player 112 providing a response to the prompt. The response received at the gaming machine 108 may include some or all of the additional information requested of the player 112 (step 512). The method may then continue with the gaming machine 108 invoking the user enrollment instructions 216 to incorporate the additional player information with the first player information into the enrollment information (step 516). The enrollment information may then be automatically transmitted to the second game management system 124 (step 520). In some embodiments, the enrollment information may be transmitted only after the gaming machine 108 has updated the enrollment information to include all of the required additional player information needed to establish the second player account with the second game management system 124.

Figure 6:
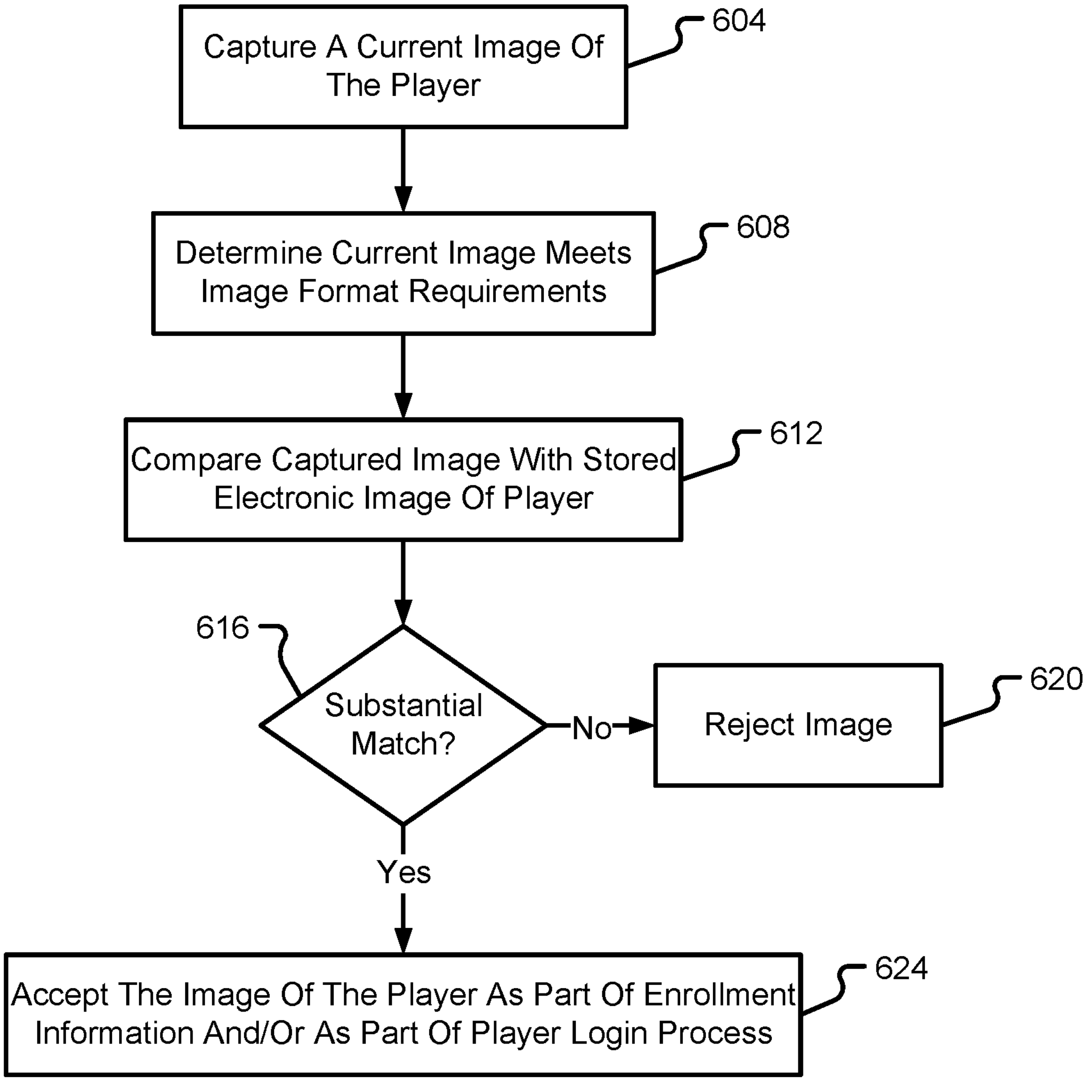
FIG. 6 is a flow diagram depicting a fourth method in accordance with embodiments of the present disclosure.

With reference now to FIG. 6, a fourth method will be described in accordance with at least some embodiments of the present disclosure. The method begins when the gaming machine 108 utilizes its camera 276 to capture a real-time or current image of the player 112 (step 604). The method may then proceed with the gaming machine 108 utilizing the user enrollment instructions 216 or one of the game login instructions 224, 228 to determine if the current image of the player 112 meets image format requirements (step 608). Image format requirements may include ensuring that appropriate player facial features (e.g., eyes, nose, ears, chin, hair, etc.) are included in the image. The image format requirements may also include ensuring that appropriate image resolution and/or size requirements are met.

Only after it is determined that the current image meets the image format requirements does the method continue by comparing the captured image with a stored electronic image of the player 112 (step 612). The comparison may be performed at the gaming machine 108 and/or at the first game management system 116. The comparison may include an image-to-image comparison. Alternatively or additionally, parameters obtained from the current image (e.g., an image template describing distances and angles between certain facial features) may be compared to parameters obtained from the stored electronic image of the player 112. Comparison of templates may result in a quicker comparison and decision process as compared to comparing full images to one another, but either approach is possible.

The method then continues by determining if the comparison results in a substantial match (step 616). Specifically, in step 616 it is determined if the current image of the player 112 matches the stored electronic image of the player 112, at least within a predefined match threshold. For instance, the predefined match threshold may require that the template obtained from the current image match the template of the electronically stored image within at least a predetermined percentage (e.g., at least 75% confidence level).

If the query of step 616 is answered negatively, then the method continues with the gaming machine 108 rejecting the image and disallowing any further processing in connection with the current image (step 620). For instance, the player 112 may be notified that the current image has been rejected and the player 112 may be requested to capture another image with the camera 276. Alternatively or additionally, the image may be archived as a rejected image to assist with training an Artificial Intelligent (AI) engine that is used to determine whether current images of players 112 satisfy or match stored electronic images of players.

If the query of step 616 is answered positively, then the method continues by accepting the current image of the player 112 and using the current image of the player 112 as part of the enrollment information and/or as part of the player login process (step 624). In some embodiments, if the current image of the player 112 satisfies certain formatting requirements, then the current image may be stored as an electronic image of the player to be referenced at a later point in time (e.g., to be compared with later-captured images of the player 112).

Variants

In some embodiments, a player 112 may provide the gaming machine 108 with an instruction to create a second player account with the second game management system 124. The player 112 may be requested by the gaming machine 108 to provide a slot account number (e.g., a number used in the first game management system 116 to reference a first player account for the player 112). Upon providing the slot account number to the gaming machine 108, the gaming machine may provide the second game management system 124 with an instruction or request to create the second player account and the instruction or request may include the slot account number provided by the player 112. The gaming machine 108 may utilize the slot account number to transmit a query for information to the first game management system 116. The query for information may include the player's slot account number. The first game management system 116 may utilize the player's 112 slot account number to look up first player information for the first player account associated with the player 112. The first player information obtained by the first game management system 116 may be provided directly to the second game management system 124, which uses some or all of the first player information to create the second player account within the second game management system 124. If the information received from the first game management system 116 (e.g., the first player information) is insufficient to complete creation of the second player account, then the second game management system 124 may request additional information from the player 112 by transmitting a request for such information back to the gaming machine 108 at which the player 112 is positioned.

The above-described variant is performed at the request of the player. It should be appreciated that the second player account may be created automatically. For example, the player may have a slot account but not a sports account. When the player inserts the player card for the slot account (or otherwise logs into the slot system), the EGM or the slot system could automatically notify the sports system to create a sports account. For example, the slot system could know the player has logged in and that the EGM/terminal also support sports wagering. With this knowledge, the slot system may automatically reach out to the sports system and provide an instruction to the sports system to create a sports account for the player that is linked to the slot account.

In a further variation of this idea, the second sports account may only be created if/when the player shows any interest in sports. The player might just play slot games, so the additional sports account may not be desired by the player; however, if the player starts to use the sports features of the EGM (e.g., view sports wagers, watch live sports video, or attempt to place sports wagers) the EGM could then automatically create or initiate the creation of the sports account without the player explicitly requesting the second account.

In another possible embodiment, a player 112 may manually enter at least some of the second player information at the gaming machine 108. Specifically, an enrollment method may include enabling the player 112 to interact with the gaming machine 108 and submit a request to establish a second player account. In response to receiving the request to establish a second player account, the gaming machine 108 may provide the player 112 with a prompt for information required to create the second player account (e.g., a prompt for second player information). The player 112 may manually enter some or all of the second player information into the gaming machine 108, which transmits the information to the second game management system 124 along with an instruction to create the second player account. In some embodiments, the gaming machine 108 may be aware of the information required to establish the second player account and will refrain from sending any information to the second game management system 124 until the information required to establish the second player account is received at the gaming machine 108. This process of providing the gaming machine 108 with intelligence to support the enrollment process (e.g., by programming the user enrollment instructions 216 with requirements of the first player account and/or second player account) may minimize unnecessary transmission of data across the communication network 104 between the gaming machine 108 and game management systems 116, 124, thereby reducing network traffic.

The present disclosure contemplates a variety of different gaming systems and environments each having one or more of a plurality of different features, attributes, or characteristics. A "gaming system" or "gaming environment" as used herein refers to various configurations of: (a) one or more central servers, central controllers, or remote hosts; (b) one or more electronic gaming machines such as those located on a casino floor; and/or (c) one or more gaming devices, such as desktop computers, laptop computers, tablet computers or computing devices, personal digital assistants, mobile phones, and other mobile computing devices. Moreover, an EGM as used herein refers to any suitable electronic gaming machine which enables a player to play a game (including but not limited to a game of chance, a game of skill, and/or a game of partial skill) to potentially win one or more awards, wherein the EGM comprises, but is not limited to: a slot machine, a video poker machine, a video lottery terminal, a terminal associated with an electronic table game, a video keno machine, a video bingo machine located on a casino floor, a sports betting terminal, or a kiosk, such as a sports betting kiosk.

In various embodiments, the gaming system of the present disclosure includes: (a) one or more electronic gaming machines in combination with one or more central servers, central controllers, or remote hosts; (b) one or more gaming devices in combination with one or more central servers, central controllers, or remote hosts; (c) one or more gaming devices in combination with one or more electronic gaming machines; (d) one or more gaming devices, one or more electronic gaming machines, and one or more central servers, central controllers, or remote hosts in combination with one another; (e) a single electronic gaming machine; (f) a plurality of electronic gaming machines in combination with one another; (g) a single gaming device; (h) a plurality of gaming devices in combination with one another; (i) a single central server, central controller, or remote host; and/or (j) a plurality of central servers, central controllers, or remote hosts in combination with one another.

For brevity and clarity and unless specifically stated otherwise, "EGM" as used herein represents one EGM or a plurality of EGMs, "gaming device" as used herein represents one gaming device or a plurality of gaming devices and, in some embodiments, may include an EGM or multiple EGMs. The use of "server, central server, central controller, or remote host" as used herein represents one central server, central controller, or remote host or a plurality of central servers, central controllers, or remote hosts.

As noted above, in various embodiments, the gaming system includes an EGM in combination with a central server, central controller, or remote host. In such embodiments, the EGM is configured to communicate with the central server, central controller, or remote host through a data network or remote communication link. In certain such embodiments, the EGM is configured to communicate with another EGM through the same data network or remote communication link or through a different data network or remote communication link. For example, the gaming system includes a plurality of EGMs that are each configured to communicate with a central server, central controller, or remote host through a data network.

In certain embodiments in which the gaming system includes an EGM in combination with a central server, central controller, or remote host, the central server, central controller, or remote host is any suitable computing device (such as a server) that includes at least one processor and at least one memory device or data storage device. As further described herein, the EGM includes at least one EGM processor configured to transmit and receive data or signals representing events, messages, commands, or any other suitable information between the EGM and the central server, central controller, or remote host. The at least one processor of that EGM is configured to execute the events, messages, or commands represented by such data or signals in conjunction with the operation of the EGM. Moreover, the at least one processor of the central server, central controller, or remote host is configured to transmit and receive data or signals representing events, messages, commands, or any other suitable information between the central server, central controller, or remote host and the EGM. The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the EGM. Further, one, more than one, or each of the functions of the at least one processor of the EGM may be performed by the at least one processor of the central server, central controller, or remote host.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In various embodiments in which the gaming system includes a plurality of EGMs, one or more of the EGMs are thin client EGMs and one or more of the EGMs are thick client EGMs. In other embodiments in which the gaming system includes one or more EGMs, certain functions of one or more of the EGMs are implemented in a thin client environment, and certain other functions of one or more of the EGMs are implemented in a thick client environment. In one such embodiment in which the gaming system includes an EGM and a central server, central controller, or remote host, computerized instructions for controlling any primary or base games displayed by the EGM are communicated from the central server, central controller, or remote host to the EGM in a thick client configuration, and computerized instructions for controlling any secondary or bonus games or other functions displayed by the EGM are executed by the central server, central controller, or remote host in a thin client configuration.

In certain embodiments in which the gaming system includes: (a) an EGM configured to communicate with a central server, central controller, or remote host through a data network; and/or (b) a plurality of EGMs configured to communicate with one another through a communication network, the communication network may include a local area network (LAN) in which the EGMs are located substantially proximate to one another and/or the central server, central controller, or remote host. In one example, the EGMs and the central server, central controller, or remote host are located in a gaming establishment or a portion of a gaming establishment.

In other embodiments in which the gaming system includes: (a) an EGM configured to communicate with a central server, central controller, or remote host through a data network; and/or (b) a plurality of EGMs configured to communicate with one another through a communication network, the communication network may include a wide area network (WAN) in which one or more of the EGMs are not necessarily located substantially proximate to another one of the EGMs and/or the central server, central controller, or remote host. For example, one or more of the EGMs are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs are located. In certain embodiments in which the communication network includes a WAN, the gaming system includes a central server, central controller, or remote host and an EGM each located in a different gaming establishment in a same geographic area, such as a same city or a same state. Gaming systems in which the communication network includes a WAN are substantially identical to gaming systems in which the communication network includes a LAN, though the quantity of EGMs in such gaming systems may vary relative to one another.

In further embodiments in which the gaming system includes: (a) an EGM configured to communicate with a central server, central controller, or remote host through a data network; and/or (b) a plurality of EGMs configured to communicate with one another through a communication network, the communication network may include an internet (such as the Internet) or an intranet. In certain such embodiments, an Internet browser of the EGM is usable to access an Internet game page from any location where an Internet connection is available. In one such embodiment, after the EGM accesses the Internet game page, the central server, central controller, or remote host identifies a player before enabling that player to place any wagers on any plays of any wagering games. In one example, the central server, central controller, or remote host identifies the player by requiring a player account of the player to be logged into via an input of a unique player name and password combination assigned to the player. The central server, central controller, or remote host may, however, identify the player in any other suitable manner, such as by validating a player tracking identification number associated with the player; by reading a player tracking card or other smart card inserted into a card reader; by validating a unique player identification number associated with the player by the central server, central controller, or remote host; or by identifying the EGM, such as by identifying the MAC address or the IP address of the Internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the Internet browser of the EGM. Examples of implementations of Internet-based gaming are further described in U.S. Pat. No. 8,764,566, entitled "Internet Remote Game Server," and U.S. Pat. No. 8,147,334, entitled "Universal Game Server."

The central server, central controller, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

As should be appreciated by one skilled in the art, aspects of the present disclosure have been illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure have been described herein with reference to flowchart illustrations and/or block diagrams of methods, apparatuses (systems) and computer program products according to embodiments of the disclosure. It should be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

What is claimed is:

1. An electronic gaming machine, comprising:

a user interface device that enables a player to interact with the electronic gaming machine;

a first communication interface that enables communications with a first game management system, wherein the first game management system stores first player information in connection with a first player account for the player;

a second communication interface that enables communications with a second game management system, wherein the second game management system is different from the first game management system;

a processor coupled to the first communication interface and the second communication interface; and a computer-readable storage medium, coupled with the processor and comprising instructions stored thereon that are executable by the processor, wherein the instructions, when executed by the processor enable the processor to:

confirm the player is logged into the first game management system;

in response to confirming that the player is logged into the first game management system, launch an enrollment process for the player with respect to the second game management system;

provide the player with a query for information in connection with the enrollment process, wherein the query comprises a request for information to create a second player account for the player in the second game management system;

receive enrollment information, wherein the enrollment information comprises at least some of the first player information; and transmit, via the second communication interface, the enrollment information to the second game management system, wherein the enrollment information enables the second game management system to create the second player account for the player.

2. The electronic gaming machine of claim 1, further comprising a credit meter that tracks available wager credits for the player, wherein the first communication interface enables communications with the first game management system via a first communication protocol, wherein the second communication interface enables communications with the second game management system via a second communication protocol, wherein the first communication interface comprises a Slot Machine Interface Board (SMIB), and wherein the SMIB communicates with the processor using a Slot Accounting System (SAS) protocol.

3. The electronic gaming machine of claim 2, wherein the first game management system comprises a casino game management system and wherein the second game management system comprises a sports wagering system.

4. The electronic gaming machine of claim 1, wherein the enrollment information comprises all of the first player information.

5. The electronic gaming machine of claim 4, wherein the enrollment information is received from a reader that reads a credential carried by the player and wherein the instructions further enable the processor to:

extract credential information from the credential;

compare the extracted credential information with information required to complete the second player account;

determine that the extracted credential information satisfies the information required to complete the second player account; and in response to determining that the extracted credential information satisfies the information required to complete the second player account, automatically transmit the extracted credential information as the enrollment information.

6. The electronic gaming machine of claim 5, wherein the credential comprises a player loyalty card and wherein the reader comprises a contact-based reading device.

7. The electronic gaming machine of claim 5, wherein the credential comprises a mobile communication device and wherein the reader comprises a contactless reading device.

8. The electronic gaming machine of claim 5, wherein the credential comprises an identification document and wherein the reader comprises a camera.

9. The electronic gaming machine of claim 1, wherein the enrollment information comprises the first player information and additional player information and wherein the instructions further enable the processor to:

present a prompt to the player via the user interface device to supplement the first player information with the additional player information;

receive a response from the player via the user interface device that comprises the additional player information; and incorporate the additional player information with the first player information into the enrollment information prior to transmitting the enrollment information to the second game management system.

10. The electronic gaming machine of claim 1, further comprising a camera and wherein the instructions further enable the processor to:

capture an image of the player;

compare the image with a stored electronic image of the player;

determine the image substantially matches the stored electronic image of the player; and in response to determining the image substantially matches the stored electronic image of the player, accept the image of the player as part of the enrollment information.

11. A system, comprising:

a first game management system that tracks player activity using first player information, wherein the first game management system stores the first player information in connection with a first player account for a player;

a second game management system that tracks player activity using second player information; and an electronic gaming machine that enables the player to interact with a game and to track player credit associated with the player interacting with the game, wherein the electronic gaming machine communicates with the first game management system and the second game management system, wherein the electronic gaming machine comprises:

a user interface device that enables the player to provide direct inputs to the electronic gaming machine and that provides outputs to the player;

a first communication interface that enables communications with the first game management system;

a second communication interface that enables communications with the second game management system;

a processor coupled to the first communication interface and the second communication interface; and a computer-readable storage medium, coupled with the processor and comprising instructions stored thereon that are executable by the processor, wherein the instructions, when executed by the processor enable the processor to enroll the player with the second game management system by:

confirming the player is logged into the first game management system;

in response to confirming that the player is logged into the first game management system, providing the player with a query for information, wherein the query comprises a request for information to create a second player account for the player in the second game management system;

receiving enrollment information, wherein the enrollment information comprises at least some of the first player information stored in connection with the first player account; and transmitting the enrollment information to the second game management system, wherein the enrollment information enables the second game management system to create the second player account for the player.

12. The system of claim 11, wherein the first game management system comprises a casino game management system and wherein the second game management system comprises a sports wagering system.

13. The system of claim 11, wherein the second game management system comprises a sports wagering system, the system further comprising:

a sports wagering database that is used by the sports wagering system to store the enrollment information as part of the second player account.

14. The system of claim 13, wherein the enrollment information comprises all of the first player information, wherein the enrollment information is received from a reader that reads a credential carried by the player, and wherein the instructions further enable the processor to:

extract credential information from the credential;

compare the extracted credential information with information required to complete the second player account;

determine that the extracted credential information satisfies the information required to complete the second player account; and in response to determining that the extracted credential information satisfies the information required to complete the second player account, automatically transmit the extracted credential information as the enrollment information.

15. The system of claim 14, wherein the credential comprises a player loyalty card and wherein the electronic gaming machine comprises a credit meter.

16. The system of claim 11, wherein the enrollment information comprises the first player information and additional player information and wherein the instructions further enable the processor to:

present a prompt to the player to supplement the first player information with the additional player information;

receive a response from the player that comprises the additional player information; and incorporate the additional player information with the first player information into the enrollment information prior to transmitting the enrollment information to the second game management system.

17. A method of operating an electronic gaming machine, the method comprising:

receiving, via a user interface device of the electronic gaming machine, first player information from a player;

logging the player into a first game management system with the first player information;

providing, via the user interface device and in response to confirming that the player has successfully logged into the first game management system, the player with a query for information, wherein the query comprises a request for information to create a second player account for the player in a second game management system;

receiving enrollment information, wherein the enrollment information comprises at least some of the first player information stored in connection with a first player account maintained by the first game management system; and transmitting the enrollment information to the second game management system, wherein the enrollment information enables the second game management system to create the second player account for the player.

18. The method of claim 17, wherein the first game management system comprises a casino game management system and wherein the second game management system comprises a sports wagering system.

19. The method of claim 17, wherein the enrollment information comprises all of the first player information, wherein the enrollment information is received from a reader that reads a credential carried by the player, and wherein the method further comprises:

extracting credential information from the credential;

comparing the extracted credential information with information required to complete the second player account;

determining that the extracted credential information satisfies the information required to complete the second player account; and in response to determining that the extracted credential information satisfies the information required to complete the second player account, automatically transmitting the extracted credential information as the enrollment information.

20. The method of claim 19, wherein the enrollment information comprises the first player information and additional player information and wherein the method further comprises:

presenting, via the user interface device, a prompt to the player to supplement the first player information the additional player information;

receiving, via the user interface device, a response from the player that comprises the additional player information; and incorporating the additional player information with the first player information into the enrollment information prior to transmitting the enrollment information to the second game management system.

* * * * *